Patented Jan. 4, 1927.

1,613,448

UNITED STATES PATENT OFFICE.

HERBERT A. ENDRES, OF LOMPOC, AND LYLE CALDWELL, OF LOS ANGELES, CALIFORNIA, ASSIGNORS TO THE CELITE COMPANY, OF LOS ANGELES, CALIFORNIA, A CORPORATION OF DELAWARE.

SILICEOUS COMPOSITION OF MATTER.

No Drawing.   Application filed December 19, 1925.   Serial No. 76,475.

Our invention relates to a new finely divided siliceous product and process of manufacturing same, the product having many advantageous characteristics referred to more fully hereinafter.

The invention, in brief, consists in causing a reaction between an active silica or siliceous material in powdered or disintegrated condition, an oxide or hydroxide of an alkali or alkaline earth metal, and water, then calcining the product of reaction, and then treating the resulting product with chlorine. Our product, therefore, may be said to compose a complex silicate, chloride, and hypochlorite.

We will hereinafter explain the invention more fully and refer to the claims for summaries of the invention, for which protection is desired.

In United States patent application filed June 23, 1925, under Serial Number 39,142, by Herbert A. Endres, a product is disclosed comprising silica and lime. The process used in that invention consists of causing a reaction between a silica and an hydroxide of an alkaline earth metal, so as to form a silicate (when lime is used a calcium silicate having the composition

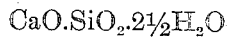

is largely formed), and then calcining the product of such reaction, carbonation of excess alkaline earth being carried out during or after calcination whenever such carbonation is desired. The present invention may be said to be an improvement upon application Serial Number 39,142, as instead of carbonating the product of reaction between silica and alkaline earth, we now chlorinate; but the product resulting from our improvement has such different properties from the prior product that it may be justly called a new and different material. The product made in accordance with our invention is capable of industrial application untouched by the product disclosed before.

For the purposes of this invention, we prefer to use an active form of silica, such as diatomaceous earth (also known as kieselguhr, infusorial earth, tripoli, etc.) pouzzolana, trass, santorin, etc. We attribute the fact that these forms of silica are more reactive than quartz to the fact that the materials above mentioned contain silica in an amorphous or partly hydrated condition. Moreover, these materials are naturally porous and thereby the final product inherits some advantages incident to such porosity.

Although diatomaceous earth and other silicates mentioned above contain various naturally occurring impurities such as alumina, iron, alkaline earths, etc., in varying minor quantities, we need not concern ourselves with the part played by these impurities. It is necessary to know the amount of impurities or of the silica present so as to determine what amount of alkali or alkaline earth metal compound should be added in order to obtain a desired result, described fully hereafter. Various forms of silica have been enumerated above and various oxides and hydroxides of alkali and alkaline earth metals may be used, but we will refer to diatomaceous silica and lime in the following examples for purposes of simplification and illustration.

When 100 parts of diatomaceous silica is intimately mixed with 93 parts of quicklime or calcium oxide, more than 125 parts by weight of water (or enough to give a workable mass) added thereto, and the mixture heated to accelerate the reaction, which is then carried to completion, the product should consist largely of a hydrated calcium mono-silicate having the composition

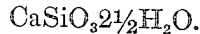

It may be here noted that the heat of slaking, when quicklime is used, may not necessitate the application of additional heat to cause the reaction to proceed to completion. The reaction may be indicated as

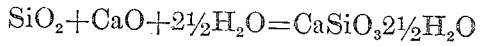

When this hydrated silicate is calcined, the combined water is driven off and the product becomes a stable silicate. The temperature of calcination should not exceed 1800° F. as sintering starts at that point; we have found that 800° to 1800° F. is a very good range.

When 100 parts of silica is mixed with 125 parts of quicklime (hydrated lime may be used if desired) and at least 125 parts of water (or enough to give a semi-fluid or workable mass), the mixture heated so as to bring the reaction to completion, and the product of such reaction calcined to a temperature of about 1500° F. or above, the product will have the composition $$CaSiO_3 + CaO$$

and contain about 14% quicklime. We then take chlorine gas from any suitable source and bubble it through water and then pass it through the material prepared as above until substantially all, or as much as is desired, of the free lime or quicklime has been combined therewith or changed into hypochlorite. The reactions involved may be represented as $$Cl_2 + H_2O = HCl + HClO$$

$$CaO + H_2O = Ca(OH)_2$$

$$Ca(OH)_2 + HCl + HClO = Ca(OCl)Cl + 2H_2O$$

The product obtained, therefore, is a mixture of calcium silicate and hypochlorite with a little water. The product made of the above proportions may contain about 75% silicate, 19% hypochlorite, and 6% water. About 10.5% of available chlorine may be present in the material.

In a similar manner, if we use a base mixture of 100 parts of silica and 200 parts of quicklime or its equivalent and a suitable amount of water, allow the reaction to go to completion by the application or generation of heat and then calcine the result of such reaction at about 1500° F., we have a material containing about 36% free lime. If this product is then chlorinated as described in the above example or in any other suitable manner, the final product may contain as much as about 40% calcium hypochlorite, or approximately 20% available chlorine, provided the reactions are all carried to completion.

As a further modification of our process, the step of calcining may be eliminated. In operating under this modification the product of the silica and alkali earth compound reaction is not calcined, but instead most of the water is removed by centrifuging, settling, filtering, or by other means, for example, vacuum drying. The excess of the alkali earth metal compound, for example lime, is in the form of a hydroxide instead of the oxide. The partly dried mass of silicate and hydroxide is then chlorinated as before described, and the product consists essentially of hydrated silicate, hypochlorite and water.

It is to be remembered that chlorination of oxides of the alkaline earths will not take place under dry conditions to any appreciable extent, and therefore moisture must be present. Calcining the product before chlorination has the advantage of removing the fairly large percentage of combined water, which is present in the silicate, and the final product is dryer.

It is not always necessary to add more than the chemical equivalent of the alkaline earth to the silica in order to produce a material containing excess alkaline earth available for chlorination inasmuch as the reaction between the silica and the alkaline earth may not be carried to completion, thereby leaving a base available for combination with chlorine to form a hypochlorite. Neither is it necessary to utilize all of the available alkaline earth in combination with the chlorine so that the final product may contain both a silicate, a hypochlorite, and free alkaline earth. All of these modifications are embraced by our invention and form a part thereof.

Certain secondary reactions may also take place and for this reason the products described in the above examples may have slightly variable compositions. First of all, the calcium silicate hydrolyses fairly readily in about the following manner:

$$CaSiO_3 + 2H_2O = Ca(OH)_2 + H_2SiO_3$$

Silicic acid may also be formed during the process of manufacture or later as follows:

$$CaSiO_3 + 2HCl = CaCl_2 + H_2SiO_3$$

$$CaSiO_3 + HCl + HClO = Ca(OCl)Cl + H_2SiO_3$$

It can therefore be seen that the product obtained by the operation of this invention is not simple and easily defined, and its ultimate analysis is influenced by many factors such as temperature, pressure, concentration of alkaline earth, time of reaction, amount of chlorine used in chlorinating, amount of water present during chlorination, etc. We therefore do not wish to be limited to any one specific composition and consider ourselves entitled to a broad interpretation of the invention.

The diatomaceous earth or other form of silica used in our process should be in a disintegrated or powdered condition in order to obtain the best results. We have also found that the quicklime or other alkaline earth, such as barium oxide or magnesia, reacts more rapidly with the silica if such alkaline earth is also ground fine before being used. The apparatus required for the manufacture of the products disclosed by us need not be described in detail, as special equipment is not required and common industrial units suffice. For example, the tank or chamber in which reaction takes place between the silica and alkali earth compound may be an ordinary tank equipped with a mechanical agitator and steam heating coils, or it may be an enclosed chamber, such as an autoclave also equipped with mechanical agitating means and a steam jacket or coils so that the reaction can take place under pressure.

Calcination of the product of reaction between silica and alkali earth compound may be effected in any suitable oven, furnace, or kiln, a muffle furnace giving very good results. The wet mixture of calcium silicate and hydroxide can be either calcined in a rotary kiln or dried out of contact with carbon dioxide as in a rotary vacuum dryer. If a rotary kiln is used the temperature of calcination must be above 1520° in order to decompose the calcium carbonate which will be formed by the action of the carbon dioxide in the combustion gases on the calcium hydroxide. A vacuum dryer requires less fuel to accomplish the desired results, but a rotary kiln will give a more finely divided, and therefore more reactive, product.

The source of chlorine is immaterial and will depend upon cost requirements, the economic location of the plant, etc. We have used gas from liquid chlorine with very good results. The chlorinating chamber may be constructed of practically any material although an aluminum chamber resists the corrosive action of chlorine and calcium hypochlorites very well.

The product may be milled or disintegrated either before or after calcination, this operation requiring only light equipment as the product at this stage is crumbly and easily crushed. The product prepared in accordance with this invention is preferred in the form of a powder, but may be produced in coarser form, for example in lumps, or may be compressed to form blocks, etc., in order to facilitate shipping. When shipped as a powder, the bags should be lined with a waterproof material, say paraffined paper, to prevent caking or loss by solvent action of water on the hypochlorites.

It is acknowledged that hypochlorites, per se, are ever new but no one, to our knowledge, has ever prepared or formed a composition in the manner described of silica (particularly diatomaceous silica) and alkaline earth. The resulting product produces results not similar to even a mechanical mixture of diatomaceous earth and an oxychloride. By the operation of our process we can produce a hypochlorite on the surfaces of porous supporting media, namely diatomaceous earth, and in intimate and homogeneous contact therewith. Such physical structure is impossibe to obtain by mechanically mixing diatomaceous earth and hypochlorite, and the results obtained by our product, in comparison with mechanical mixtures, are far superior. The secondary reactions described before may have some bearing upon the results obtained. The material may be used as an ingredient in hydraulic cement compositions as a decolorizing agent in the treatment of fats, waxes, gums, vegetable oils, etc., and in many other ways.

What is claimed is as follows:

1. The process of producing a finely divided material comprising heating a mixture of finely divided silica, a hydroxide of an alkaline earth, metal and water; calcining the product of such heating; and chlorinating the product of such calcination in the presence of moisture.

2. The process of making a finely divided material comprising mixing a finely divided silica with lime and water; maintaining such mixture in a heated condition until the reaction is complete; calcining the product of such reaction; and then chlorinating the product of such calcination in the presence of moisture.

3. The process of making an article of manufacture, comprising mixing finely divided diatomaceous earth with lime and water; heating the mixture; calcining the product of such heating; and then chlorinating the product of such calcination in the presence of moisture.

4. The process of making an article of manufacture, comprising adding finely divided silica to more than its chemical equivalent of a hydroxide of an alkaline earth metal and water; heating the mixture; calcining the product of such heating to convert excess hydroxide of alkaline earth metal to oxide; and then converting the oxide to hypochloride.

5. The process of making a new article of manufacture, comprising adding finely divided diatomaceous earth to more than its chemical equivalent of lime; and mixing with water; heating the mixture to produce a reaction; calcining the product of such reaction to convert excess calcium hydroxide to calcium oxide; and then converting the oxide to hypochlorite.

6. The process of making a composition of matter comprising mixing finely divided diatomaceous earth, lime, and water; heating the mixture to cause a reaction; removing excess water from the product of such reaction; and then chlorinating the mixture.

7. A new article of manufacture produced by mixing disintegrated diatomaceous earth with a hydroxide of an alkaline earth metal and water, heating the mixture to produce a reaction, calcining the product of such reaction and then chlorinating the calcined product in the presence of moisture.

8. A new article of manufacture produced by mixing disintegrated diatomaceous earth with lime and water, heating the mixture to produce a reaction, calcining the product of such reaction, and then chlorinating the calcined product in the presence of moisture.

9. As an article of manufacture, a product obtained by chlorinating the product of reaction between finely divided diatomaceous earth and a hydroxide of an alkaline earth metal.

10. As an article of manufacture, a material obtained by mixing finely divided diatomaceous earth with more than its chemical equivalent of lime and water, heating the mixture to cause a reaction, calcining the product of such reaction, and then chlorinating the product of such calcination in the presence of moisture.

11. A new product obtained by mixing finely divided diatomaceous earth with more than its chemical equivalent of lime and water, heating the mixture to cause a reaction, removing excess water from the product of such reaction, and then chlorinating the partly dried product.

12. As an article of manufacture, a product obtained by chlorinating the product of reaction between finely divided silica and a hydroxide of an alkaline earth metal.

13. A new product obtained by heating a mixture of finely divided silica, lime and water to cause reaction; and then chlorinating the resultant product.

14. A new product obtained by heating a mixture of diatomaceous earth, lime and water to cause reaction; and then chlorinating the resultant product.

15. The herein described process of making a composition of matter; comprising heating a mixture of finely divided silica, lime, and water to cause reaction; and chlorinating the resultant product.

16. The herein described process of making a composition of matter; comprising heating a mixture of diatomaceous earth, lime, and water to cause reaction; and chlorinating the resultant product.

17. As an article of manufacture, the product obtained by chlorinating the product of reaction between disintegrated diatomaceous earth and a hydroxide of an alkaline earth metal, comprising particles of diatomaceous earth coated with silicate and hypochlorite of an alkaline earth metal.

In testimony that we claim the foregoing as our own, we affix our signatures.

HERBERT A. ENDRES.
LYLE CALDWELL.